United States Patent [19]
Vicentini et al.

[11] 3,941,935
[45] Mar. 2, 1976

[54] CENTRALIZED DEBITING SYSTEM FOR TDM TELECOMMUNICATION NETWORK

[75] Inventors: Arnaldo Vicentini; Francesco Maschi; Guido Arrigoni, all of Milan, Italy

[73] Assignee: Societa Italiana Telecomunicazioni Siemens S.p.A., Milan, Italy

[22] Filed: Apr. 24, 1974

[21] Appl. No.: 463,761

[30] Foreign Application Priority Data
Apr. 24, 1973 Italy.................................. 23360/73

[52] U.S. Cl........................... 179/15 AT; 179/7 MM
[51] Int. Cl.²......................................... H04M 15/00
[58] Field of Search ........ 179/15 AT, 7.1 R, 7 MM, 179/8, 9, 10

[56] References Cited
UNITED STATES PATENTS

| | | | |
|---|---|---|---|
| 3,433,898 | 3/1969 | Sellenslagh .................... | 179/7 MM |
| 3,581,016 | 5/1971 | Martinelli...................... | 179/15 AT |
| 3,591,723 | 7/1971 | Dal Monte..................... | 179/7 MM |
| 3,657,482 | 4/1972 | Dal Monte..................... | 179/7 MM |

*Primary Examiner*—Thomas W. Brown
*Attorney, Agent, or Firm*—Karl F. Ross; Herbert Dubno

[57] ABSTRACT
A telephone exchange of the time-division-multiplex type is provided with several synchronized circulating memories whose operating cycle is divided into, say, 100 phases corresponding to respective time slots of a communication frame whereby a multiplicity of conversations can be initiated and carried on simultaneously between calling and responding subscribers. These memories include a caller memory I, a responder memory N, a monitoring memory LP, a counting memory LK, and two ancillary memories $LT_1$, $LT_2$ respectively associated with the caller and the responder. Monitoring memory LP, registering the progress of a call in a corresponding phase thereof, defines up to 10 different states in the establishment of a connection; in the event of a toll call, state No. 10 is followed by either state No. 11 or state No. 12, depending on whether the charge is to be debited to the calling or the called party, wherever a supervisory unit emits a rate pulse. In either case, the counting memory LK registers a series of clock pulses in successive cycles which measure the length of a charge pulse to be stored in ancillary memory $LT_1$ or $LT_2$ in the form of a bit recurring over a predetermined number of cycles. The charge pulse read out from the ancillary memory during the corresponding time slot of a frame is integrated and rounded in a harmonics suppressor before being used to modulate the amplitude of a high-frequency carrier delivered to the respective subscriber line for stepping a pulse counter connected thereto.

10 Claims, 4 Drawing Figures

CENTRALIZED DEBITING SYSTEM FOR TDM TELECOMMUNICATION NETWORK

FIELD OF THE INVENTION

Our present invention relates to a central debiting system for telephone or other telecommunication networks of the time-division-multiplex (TDM) type in which a central office or exchange, serving a multiplicity of subscriber lines, establishes connections (hereinafter referred to as toll calls) which are to be charged to the account of a participating subscriber. Such connections, as is well known, may interlink subscribers served by the same exchange or may include trunk lines extending between different exchanges.

BACKGROUND OF THE INVENTION

Systems for debiting a subscriber participating in a toll call are known, for example, from commonly owned U.S. Pat. Nos. 3,591,723 and 3,657,482 granted to Giorgio Dal Monte. These systems, however, relate to exchanges of the space-division type, i.e. wherein the several subscriber lines (or their extensions terminating at the exchange) are physically separated and individually accessible through cross-bar switches or the like. Such debiting systems are not readily adaptable to the TDM exchanges in which simultaneous connections between different subscriber pairs are established in respective time slots of a communication frame recurring, for example, 8000 times per second so as to have a duration of 125 $\mu$s. This type of TDM exchange has been described in commonly owned U.S. Pat. No. 3,581,016 granted to Saverio Martinelli and Giorgio De Varda. Such an exchange comprises a group of synchronously circulating memories for the temporary storage of data relating to the progress of the several connections concurrently established, the operating cycle of these memories coinciding with a communication frame and being subdivided into a multiplicity of phases (e.g. 100) corresponding to the time slots of that frame. More specifically, the group comprises a caller memory registering in its phases the addresses (i.e. call numbers) or respective calling parties, a responder memory registering in corresponding phases the addresses of respective called parties, and a monitoring memory whose corresponding phases contain entries which identify successive stages in the establishment and consummation of a connection. More particularly, the entries in the phases of the monitoring memory according to the Martinelli et al patent represent successive numerical values or "states", with state No. 10 denoting the completed establishment of a connection between a calling and a called subscriber preparatorily to the exchange of information between these subscribers.

OBJECTS OF THE INVENTION

The general object of our present invention is to provide a debiting system suitable for TDM exchanges.

A more specific object is to provide a system of this nature adapted to be used in an exchange of the type disclosed in the above-identified Martinelli et al patent.

SUMMARY OF THE INVENTION

The exchange of a TDM telecommunication network embodying our invention includes a supervisory unit which processes, in a manner known per se, certain information concerning an established toll call (such as the distance between the intercommunicating subscribers) to generate a succession of rate pulses indicative of the number of toll units to be charged to the account of one of the participating subscribers, usually the calling party. These rate pulses, which in the case of a trunk call may be derived from similar pulses arriving from a remote exchange, recur with a frequency depending on the applicable unit rate (e.g. charge per minute) and are to be registered on a counter individual to the subscriber to be debited. The supervisory unit is connected to one of the synchronized circulating memories, specifically the aforementioned monitoring memory, for registering a characteristic entry in a phase thereof assigned to a toll call upon the occurrence of each pulse relating to that call; in the particular instance in which state No. 10 is entered in that phase at the commencement of the toll call, i.e. upon the establishment of the connection between the subscribers, this characteristic entry may be designated state No. 11 and may be represented by the corresponding decimal value inscribed in binary form on the several memory tracks. The circuitry inscribing that characteristic entry in the monitoring memory controls a counting unit which preserves this entry in the assigned memory phase for a predetermined number of operating cycles. During that period, a pulse generator under the control of the monitoring memory emits a train of voltage pulses converted by an integrator into a single charge pulse which is delivered to the line of the participating subscriber that is to be debited for the toll call.

According to a more specific feature of our invention, the counting unit comprises a further circulating memory of the synchronized group, a numerical value progressively increasing over consecutive operating cycles being inscribed in the corresponding phase of this counting memory until it reaches a predetermined limit whereupon the writing circuitry for the monitoring memory cancels the characteristic entry previously inscribed therein. This cancellation may involve a restoration of state No. 10 in lieu of the previously entered state No. 11.

In accordance with another feature of our invention, the pulse generator controlled by the monitoring memory comprises an ancillary circulating memory of the same group, synchronized therewith, whose input circuit enters a bit in a corresponding phase thereof during each operating cycle in which the monitoring cycle carries the characteristic entry.

If the toll charge is to be debited either to the calling or to the called subscriber (the latter, for example, in the case of a collect call), two such ancillary memories may be provided. The characteristic entry may then take one of two forms, e.g. state No. 11 and state No. 12, depending on whether the calling or the called subscriber is to be debited; according to the form of that entry, one or the other ancillary memory is recurrently loaded with the bit.

The delivery of the charge pulse to the line of the subscriber to be debited, pursuant to still another feature of our invention, involves the modulation of the amplitudes of a carrier wave under the control of that charge pulse, the frequency of the carrier wave advantageously lying outside the band of voice frequencies to be transmitted over the subscriber line in the case of a telephone network. Filters may be provided to block the transmission of this carrier frequency to a common voice channel terminating at the exchange and to attenuate it toward the subscriber station. The generation of annoying transients, which could penetrate the filters, is avoided by a smoothing circuit which rounds the leading and trailing edges of the charge pulse; advantageously, the carrier frequency is cut off in the absence of a charge pulse so that its envelope, conforming to the charge pulse, has generally sinusoidally rising and falling flanks.

BRIEF DESCRIPTION OF THE DRAWING

The above and other features of our invention will now be described in detail with reference to the accompanying drawing in which.

SPECIFIC DESCRIPTION

Figure 1:
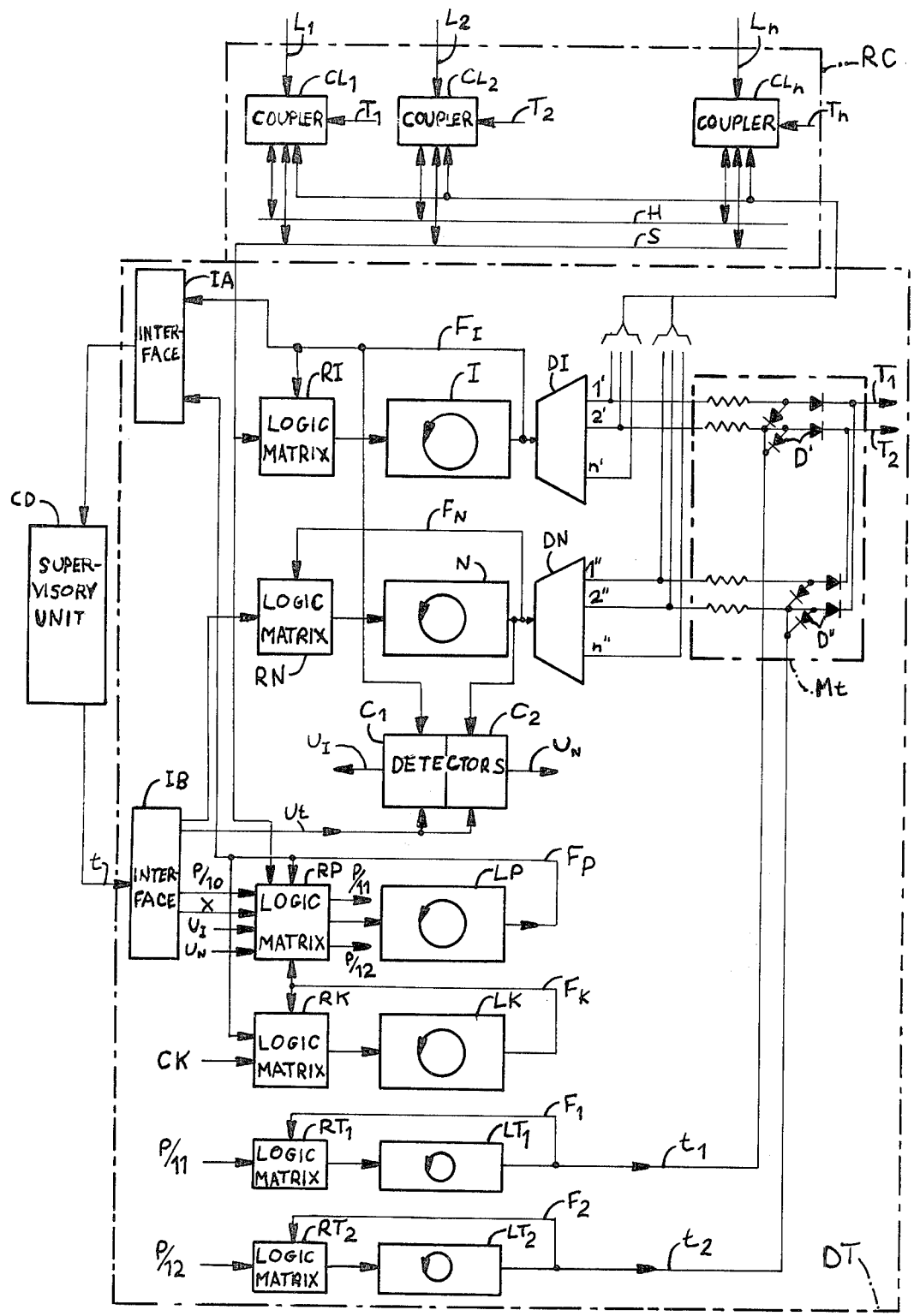
FIG. 1 is a block diagram of a debiting system embodying our invention.

In FIG. 1 we have shown several subscriber lines $L_1$, $L_2$, ... $L_n$ terminating at an exchange of the general type disclosed in the above-identified Martinelli et al patent, only so much of that exchange having been illustrated as is necessary for an understanding of our present invention. The lines $L_1 - L_n$ are branches of a common transmission path, including a voice channel H and a service line S, through a network RC comprising couplers $CL_1$, $CL_2$ ... $CL_n$ one of which, generically designated CL, has been shown in detail in FIG. 3 described below.

Service line S extends to a central processor DT including a group of synchronized circulating memories, i.e. a caller memory I, a responder memory N, a monitoring memory LP, a counting memory LK, and two ancillary memories $LT_1$, $LT_2$. These memories are provided with respective input circuits RI, RN, RP, RK, $RT_1$ and $RT_2$ in the form of fixed logic matrices. Reinscription of entries read out of a given memory phase via the respective input circuit, in its original or in modified form, takes place via a feedback loop which has been respectively designated $F_I$, $F_N$, $F_P$, $F_K$, $F_1$ and $F_2$. For details of the construction of such a circulating memory and its writing and reading means, reference may be made to commonly owned U.S. Pat. No. 3,603,774 granted to Saverio Martinelli et al.

The binary numbers constituting the entries in the phases of memories I and N are translated by associated decoders DI and DN into signals on respective leads $1', 2', \ldots n'$ and $1'', 2'', \ldots n''$ controlling the temporary closure of line switches SW (FIG. 3), operating as sampling gates, in their respective coupling circuits $CL_1 \ldots CL_n$.

Memories I and LP have output connections to an interface unit IA which informs a supervisory unit CD of the progress of a connection to be established or already in existence. As described in the first-mentioned Martinelli et al patent, the address of the calling subscriber is inscribed in an assigned phase of memory I which happens to be vacant as indicated by state No. 0 in the corresponding phase of memory LP. When the caller dials the number of the party to be called, the latter number is inscribed via an interface unit IB and circuit RN in the parallel phase of memory N. The circulating addresses are continuously read out to a pair of decoders $C_1$ and $C_2$ which also periodically receive from unit IB the address of the party to be charged for a toll call. This determination may be made by unit CD from certain prefixes present in the dialed number.

From the information transmitted to it by interface unit IA, supervisory unit DC computes the frequency with which a rate pulse is to be emitted via a line $t$ extending to interface unit IB which feeds the input circuits RN and RP associated with memories N and LP. These pulses coincide with the time slot assigned to the toll call in question and are generated when the corresponding phase of monitoring memory LP has reached state No. 10, indicating the interlinking of the two subscribers, after passing through the preceding states (Nos. 1 - 9) which are of no interest here.

The change of state of a phase of memory LP is controlled by supervisory unit CD in response to line tests periodically performed, as described in Martinelli et al U.S. Pat. No. 3,581,016, on the basis of the current state of that phase as reported to unit CD via unit IA from the output $F_P$ of memory LP.

Thus, the arrival of a rate pulse at unit IB during a particular time slot presupposes the existence of state No. 10 in the corresponding phase of memory LP as diagrammatically indicated by the symbol P/10 in FIG. 1. This rate pulse, indicated at X, reaches the input circuit RP while an address code Ut is delivered by unit IB to detectors $C_1$ and $C_2$ which compare that code with those stored in memories I and N. If the corresponding address is that of the calling party, registered in memory I, a first discriminating pulse $U_I$ appears in the output of detector $C_1$; if it is that of the called party, registered in memory N, a second discriminating pulse $U_N$ appears in the output of detector $C_2$. The discriminating pulse so produced is fed to circuit RP to change the state of the corresponding phase of memory LP from No. 10 to No. 11 or No. 12.

The change to state No. 11, indicating that the calling subscriber is to be charged, results in the transmission of a pulse P/11 from circuit RP to circuit $RT_1$ associated with ancillary memory $LT_1$. Similarly, the change to state No. 12 (indicating that the called subscriber is to be debited) causes the transmission of a pulse P/12 from circuit RP to circuit $RT_2$ associated with ancillary memory $LT_2$. Thus, pulses P/11 and P/12 satisfy the following logical equations:

$$P/11 = P/10 . U_I . X \qquad (1)$$

$$P/12 = P/10 . U_N . X \qquad (2)$$

If either state No. 11 or state No. 12 is read out from a phase of memory LP, input circuit RK associated with counting memory LK unblocks a line CK from a nonillustrated clock circuit which times the operation of the exchange and whose operating frequency corresponds to the recurrence rate of the time slots. Thus, the coincidence of a clock pulse with such an output from memory LP causes the entry, in a corresponding phase of memory LK, of a numerical value which progressively increases during successive frames until it reaches a predetermined limit as detected by a nonillustrated comparator in circuit RP. At this point the circuit RP cancels the emission of pulse P/11 or P/12 and restores state No. 10 in the corresponding phase of memory LP, thus preparing the way for the emission of a new rate pulse by unit CD.

The presence of a pulse P/11 in the input of circuit RT₁ causes the inscription and continuous recirculation of a bit "1" in the corresponding phase of ancillary memory LT₁. Similarly, the presence of a pulse P/12 in the input of circuit RT₂ enters and maintains a bit "1" in the corresonding phase of ancillary memory LT₂. The bits so entered are read out via a respective line $t_1$ or $t_2$ to a matrix $Mt$ formed by extensions of the output leads $1' - n'$ and $1'' - n''$ of decoders DI and DN. Through respective diodes D' or D'', the voltage on line $t_1$ or $t_2$ energizes the corresponding set of leads of the matrix at the instant when one of these leads, i.e. the one to which the phase here considered has been assigned, is driven positive by the associated decoder DI or DN. This gives rise to a train of voltage pulses $T_1$, $T_2$, ... $T_n$ applied to the corresponding coupler $CL_1$, $CL_2$, ... $CL_n$ in network RC, the pulse train being converted within the coupler into a charge pulse of predetermined duration as described hereinafter with reference to FIGS. 3 and 4.

Figure 2:
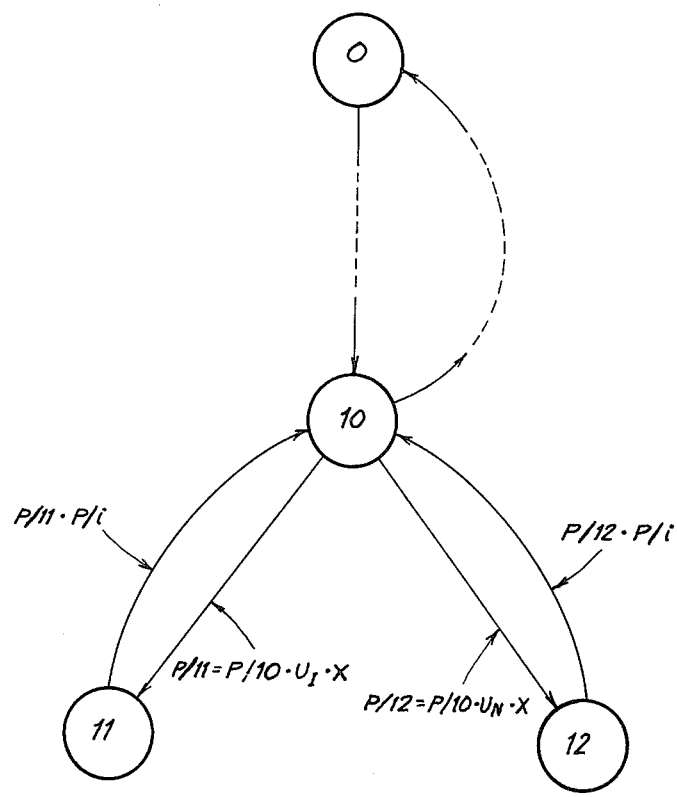
FIG. 2 is a flow diagram relating to certain aspects of the operation of the system in FIG. 1.

In FIG. 2 we have diagrammatically illustrated the changeover of a phase of memory LP among states Nos. 10, 11 and 12, state No. 0 having been included for the sake of completeness. The phase is advanced to state No. 11 or No. 12 in conformity with logical equation (1) or (2); the switch-back to state No. 10 takes place in accordance with the logical equation $$P/10 = P/11.P/i + P/12.P/i \qquad (3)$$

where P/i denotes the output of the comparator within circuit RP upon the stored value in memory LK reaching its predetermined limit ($i$). The return to state No. 0 occurs, of course, upon termination of the call.

Figure 4:
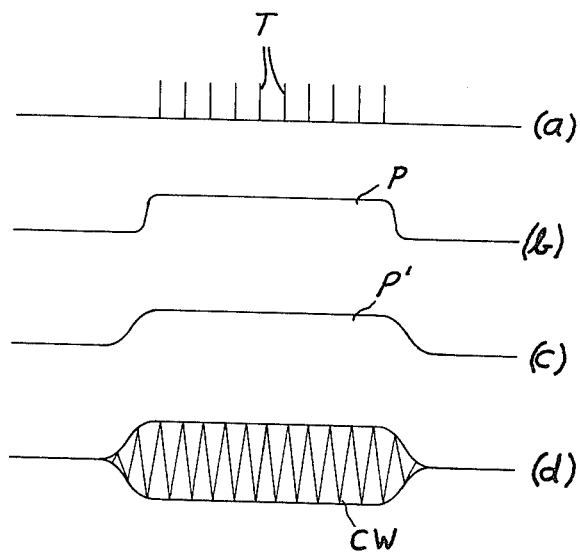
FIG. 4 is a set of graphs relating to the operation of the circuits shown in FIG. 3.
Figure 3:
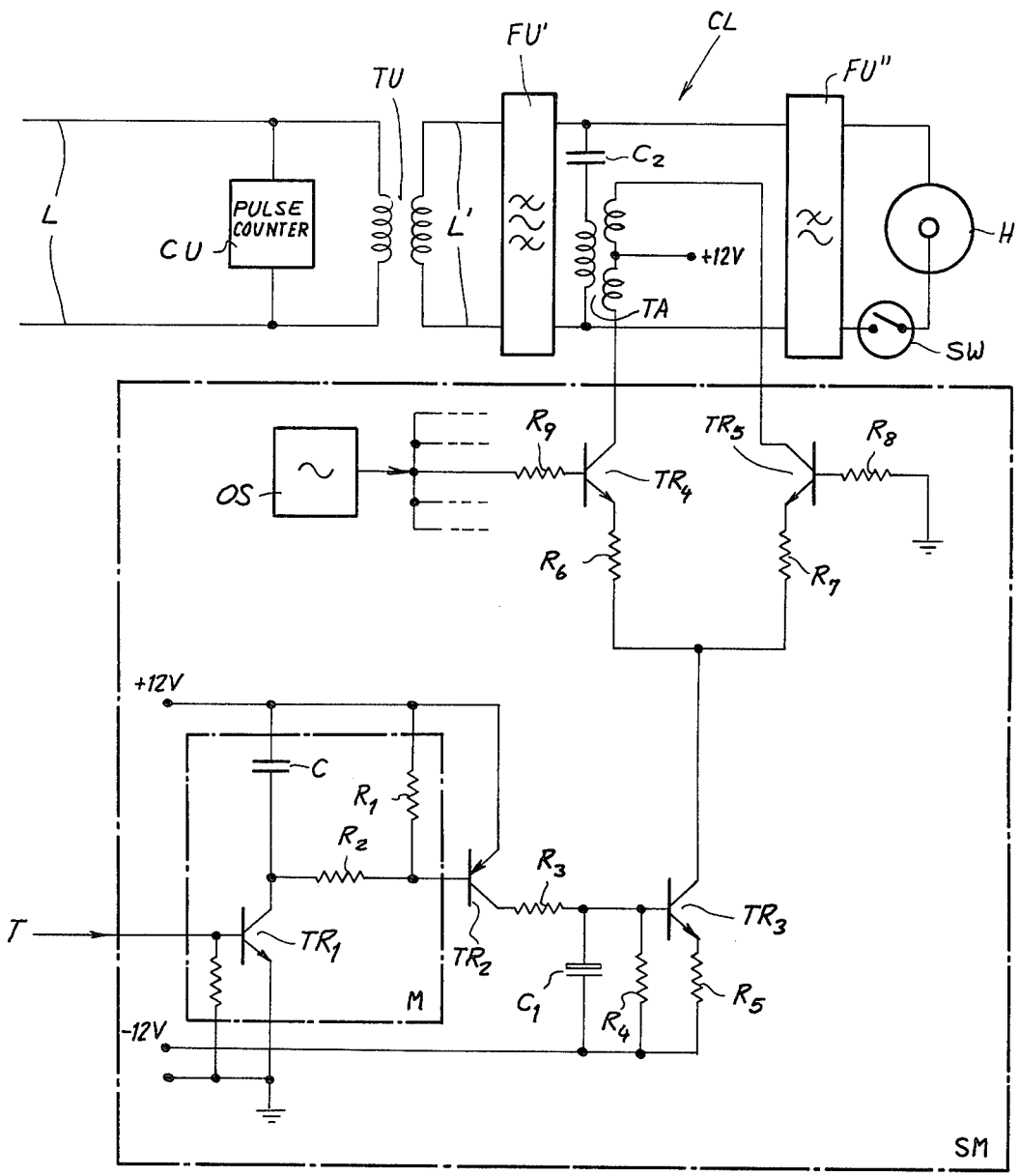
FIG. 3 is a more detailed circuit diagram of part of the system.

FIG. 3 shows details of the coupler CL to which a train of pulses T is being applied; see also graph (a) of FIG. 4. This pulse train energizes the base of a normally nonconductive NPN transistor TR₁ whose emitter is grounded and whose collector is connected to a source of positive voltage +12V through a time-constant network comprising a capacitor C and a pair of resistors R₁, R₂ constituting a voltage divider. Transistor TR₁, forming the first stage of a multistage amplifier, and time-constant network C, R₁, R₂ form part of an integrator M which converts the pulse train T into a single charge pulse P as shown in graph (b) of FIG. 4; for this purpose the time constant of the network must be greater than the frame period of, say, 125μs. Voltage divider R₁, R₂ normally biases to cutoff the base of a second-stage PNP transistor TR₂ whose emitter is connected to the positive pole +12V and whose collector is connected to the negative pole −12V of the voltage source via a smoothing network comprising a series resistor R₃ and a shunt capacitor C₁ in parallel with a resistor R₄ in the input of a third-stage NPN transistor TR₃. The latter transistor, whose base is tied to the collector of transistor TR₂ by way of resistor R₃, has its emitter joined through a resistor R₅ to negative voltage −12V and is also normally nonconductive; smoothing network C₁, R₃, R₄ rounds the leading and trailing edges of charge pulse P as illustrated at P' in graph (c) of FIG. 4.

A fourth amplifier stage comprises a pair of matched NPN transistors TR₄ and TR₅ whose emitters are connected in parallel to the collector of transistor TR₃ via respective resistors R₆ and R₇. Amplifier stages TR₁ – TR₅ form part of a modulator SM also including a local oscillator OS emitting a carrier wave whose frequency, e.g. of 16 kHz, lies well above the band of voice frequencies transmitted over the subscriber lines L. Oscillator OS, which is common to the several couples LC, works through a resistor R₉ into the base of transistor TR₄ whose counterpart TR₅ has its base grounded through a resistor R₈. The collectors of these two transistors are interconnected through the primary winding of a modulating transformer TA whose midpoint is connected to positive voltage +12V.

Subscriber line L is connected to voice channel H (here shown as a coaxial line) via an extension L' through the intermediary of a coupling transformer TU; line extension L' contains the usual voice filter FU', passing a speech band in the range of 300 to 3400 Hz, and also includes a low-pass filter FU'' blocking the carrier frequency of oscillator OS. The secondary of transformer TA is connected across line extension L', between the two filters FU', FU'', in series with a capacitor C₂ forming therewith a resonant circuit which is tuned to the carrier frequency of 16 kHz. The two filters FU' and FU'' prevent that carrier frequency from reaching either the subscriber line L or the voice channel H which is periodically connected to line L', in the active condition of that line, through closure of a sampling switch SW. Modulating transformer TA lies at a junction of band-pass filter FU' with the common voice channel H from which it is separated by the low-pass filter FU''.

A pulse counter CU is connected across the secondary of transformer TU to receive the charge pulse P' which modulates the envelope of carrier wave $cw$ as shown in graph (d) of FIG. 4. The rounding of the edges of the pulse P' entails a gradual, generally sinusoidal rise and fall of the flanks of that envelope to eliminate objectionable transients. This envelope is detected by the filter FU'' and reaches the pulse counter CU while the carrier itself does not. Even though oscillator OS operates continuously, transformer TA is not energized in the absence of a pulse train T since its circuit is interrupted by the nonconductive transistor TR₃.

The toll charge registered in counter CU may be stored in an associated section of a memory, e.g. as disclosed in the aforementioned Dal Monte patents, or may be recorded in some other convenient manner.

We claim:

1. In a time-division-multiplex telecommunication system including an exchange serving a multiplicity of subscriber lines, in combination:

central-office equipment at said exchange for establishing a connection between a calling subscriber and a called subscriber, at least some connections so established being toll calls to be debited to participating subscribers, said equipment including a group of synchronously circulating memories for the temporary storage of data relating to the progress of a multiplicity of connections concurrently established in respective time slots of a recurrent communication frame, each of said memories having an operating cycle coextensive with said frame and subdivided into a multiplicity of phases corresponding to the time slots of said frame;

supervisory means operative upon the stablishment of a toll call in one of said time slots for generating a succession of rate pulses indicative of the number of toll units to be charged to the account of a subscriber participating in said toll call;

circuit means connecting said supervisory means to one memory of said group for registering a characteristic entry in a phase thereof, assigned to said toll call, in response to a rate signal;

counting means controlled by said circuit means for preserving said characteristic entry in said assigned phase for a predetermined number of operating cycles;

pulse-generating means controlled by said one memory for emitting a voltage pulse upon each occurrence of each characteristic entry in successive operating cycles;

integrating means connected to said pulse-generating means for converting a train of said voltage pulses into a single charge pulse; and output means connected to said integrating means for delivering said charge pulse to the line of the participating subscriber to be debited for the toll call.

2. The combination defined in claim 1 wherein said counting means comprises a second memory of said group, writing means for inscribing in a corresponding phase of said second memory a numerical value progressively increasing over consecutive operating cycles, and reading means connected between said second memory and said circuit means for canceling said characteristic entry upon said numerical value reaching a predetermined limit.

3. The combination defined in claim 2 wherein said pulse-generating means comprises a third memory of said group provided with input means for entering a bit in a corresponding phase thereof during each operating cycle in which said characteristic entry is present in said one memory.

4. The combination defined in claim 2 wherein said supervisory means has a pair of alternate outputs for discriminating between toll connections charged to the account of a calling subscriber and toll connections charged to the account of a caller subscriber, said characteristic entry assuming one of two alternate forms depending upon which of said outputs is energized; said pulse-generating means comprising a pair of further memories of said group provided with input means for entering a bit in a corresponding phase of either of said further memories, depending upon the form of said characteristic entry, during each operating cycle in which said characteristic entry is present in said one memory.

5. The combination defined in claim 1 wherein said output means comprises a source of carrier wave and modulating means connected to said integrating means and to said source for varying the amplitude of said carrier wave under the control of said charge pulse.

6. The combination defined in claim 5 wherein said subscriber lines are voice channels, said carrier wave having a frequency outside the band of voice frequencies.

7. The combination defined in claim 6 wherein said subscriber lines are branches of a common voice channel terminating at said exchange, each of said branches being provided with a band-pass filter giving passage to the band of voice frequencies, said modulating means being connected to the corresponding branch at a junction between said band-pass filter and said common transmission path.

8. The combination defined in claim 7 wherein each of said branches is further provided with a filter network blocking said carrier frequency, said filter network being interposed between said common voice channel and said junction.

9. The combination defined in claim 5 wherein said modulating means comprises amplifier means provided with biasing means for cutting off said carrier wave in the absence of said charge pulse and further provided with smoothing means for rounding the edges of said charge pulse with corresponding rounding of the envelope flanks of said carrier wave.

10. The combination defined in claim 9 wherein said amplifier means comprises a plurality of cascaded transistor stages including a normally nonconductive first stage rendered conductive by said voltage pulses, a normally nonconductive second stage adapted to be driven conductive by said biasing means, a normally nonconductive third stage adapted to be driven conductive by said smoothing means, and a fourth stage constituted by a pair of matching transistors with emitters connected in parallel to the output of said third stage, with bases respectively connected to said source of carrier wave and to a point of fixed reference potential, and with collectors connected across said line through a tuned circuit resonant at the frequency of said carrier wave.

* * * * *